(12) United States Patent
Kekahuna et al.

(10) Patent No.: US 8,894,329 B1
(45) Date of Patent: Nov. 25, 2014

(54) WEDGE ANCHOR BOLT

(71) Applicant: Climb Tech, LLC., Austin, TX (US)

(72) Inventors: Ivan A. J. Kekahuna, Austin, TX (US);
Eric Shawn Patrick, Austin, TX (US)

( * ) Notice: Subject to any disclaimer, the term of this patent is extended or adjusted under 35 U.S.C. 154(b) by 0 days.

(21) Appl. No.: 13/907,473

(22) Filed: May 31, 2013

(51) Int. Cl.
  *E21D 21/00* (2006.01)
  *E04B 1/41* (2006.01)
(52) U.S. Cl.
  CPC ................... *E04B 1/4157* (2013.01)
  USPC .................... 405/259.4; 405/259.3
(58) Field of Classification Search
  USPC .......................... 405/259.1–259.6
  See application file for complete search history.

(56) References Cited

U.S. PATENT DOCUMENTS

| | | | | |
|---|---|---|---|---|
| 5,161,916 A | * | 11/1992 | White et al. ............... | 405/259.6 |
| 5,232,311 A | * | 8/1993 | Stankus ..................... | 405/259.6 |
| 5,599,140 A | * | 2/1997 | Wright ...................... | 405/259.6 |
| 7,073,982 B2 | * | 7/2006 | Stankus et al. ............. | 405/259.6 |
| 8,277,149 B2 | * | 10/2012 | Sligar et al. ................ | 405/302.2 |
| 8,282,318 B2 | * | 10/2012 | Robertson, Jr. ............ | 405/259.4 |
| 2002/0094240 A1 | * | 7/2002 | Cook ......................... | 405/259.4 |
| 2010/0221072 A1 | * | 9/2010 | Robertson, Jr. ............ | 405/259.4 |
| 2011/0250022 A1 | * | 10/2011 | Robertson, Jr. ............ | 405/259.4 |

* cited by examiner

*Primary Examiner* — Benjamin Fiorello
(74) *Attorney, Agent, or Firm* — Portland Intellectual Property, LLC (57) ABSTRACT

A wedge anchor bolt having a screw member, a wedge member, and a cage member. The bolt is anchored into a drilled hole by wedging the wedge member in the end of the cage member by turning the screw member, with the result being that the wedge member becomes stuck in the cage member. For ejecting the wedge member from the cavity the screw member includes at least one of (1) one or more depressed portions, and (2) one or more projecting portions, defining a step, and the cage member includes one or more corresponding step-engaging portions for making an interference contact with the step, so that further withdrawal of the threads ceases to withdraw the threads relative to the cage member while continuing to withdraw the threads relative to the wedge member, thereby forcing the wedge member distally relative to the cavity.

20 Claims, 8 Drawing Sheets

WEDGE ANCHOR BOLT

FIELD OF THE INVENTION

The present invention relates to low cost wedge anchor bolts of the type commonly used to mount metal structures to concrete.

BACKGROUND

Figure 1:
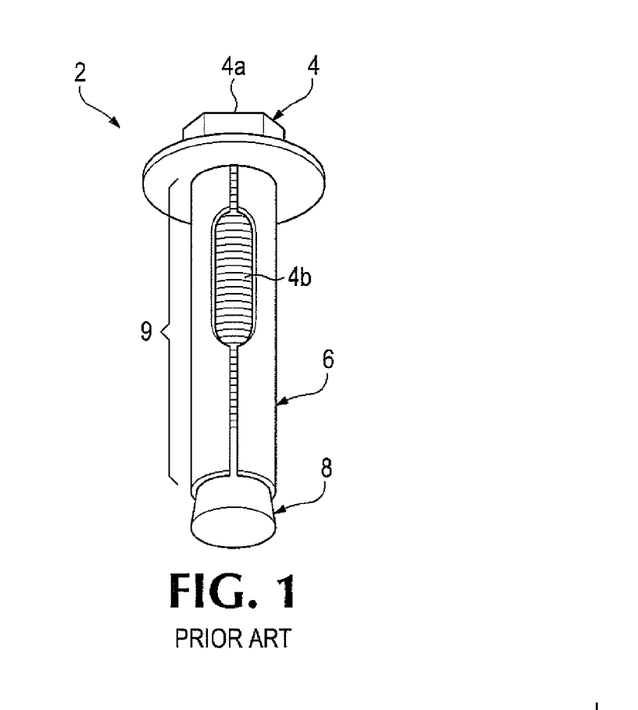
FIG. 1 is an isometric view of a prior art basic wedge anchor bolt.

An example is shown in FIG. 1. A low cost wedge anchor bolt 2 has a screw 4 with a screw-head 4a and a shank 4b. An expandable cage 6 is coaxially disposed around the shank 4b, and the shank 4b has a threaded end for engaging the internal threads of a wedge 8 at the distal end of the shank. An insertion portion 9 of the bolt 2, defined by the shank 4b, cage 6, and wedge 8, is inserted into a drilled hole in the structure to which the anchor bolt is to be anchored.

Turning the screw 4 in one direction, typically clockwise, threads the shank 4b further into the wedge 8, drawing the wedge into the cage 6 and thereby causing the cage to expand. Continuing to turn the screw in the same direction eventually results in the cage 6 being expanded sufficiently tightly against the interior surface(s) of the hole to result in a frictional anchoring of the insertion portion 9 therein.

Low cost wedge anchor bolts like that shown in FIG. 1 can be used to provide fall protection for construction workers constructing buildings formed of concrete walls, floors, or ceilings. For that purpose a piece of "bolt attachment" hardware is provided (not shown in FIG. 2) allowing for a worker's connection with the anchor bolt. Typically, the bolt attachment hardware is a plate having two through-apertures, one through which the screw 4 extends, for capturing and thus securing the bolt attachment hardware behind the screw-head and the wall (or ceiling, or other surface) into which the hole is drilled, and the other for allowing the user to connect with the anchor bolt via a clip known as a "carabiner." Typically, the worker is wearing a harness and the harness is connected with the bolt attachment hardware via a lanyard having a carabiner at each end, one for connecting to the harness and one for connecting to the bolt attachment hardware.

Low cost wedge anchor bolts used in providing fall protection for construction workers are generally not needed after construction is complete. Moreover, to maintain the low cost, the components of the basic wedge anchor bolt are typically formed of ordinary steel and are thus susceptible to corrosion. So it is often desirable, and it is often otherwise required by local building codes, to remove them after construction is complete, because corrosion of the bolt will weaken the surrounding concrete, thus weakening the structure.

The problem is that the low cost wedge anchor bolt is not easily removable. Once the bolt is tightened, the cage 6 and wedge 8 become, together, stuck in the hole, and there is no mechanism provided for separating them. Thus while turning the screw in the opposite direction allows for withdrawing the screw 4 from the hole, the cage 6 and the wedge 8 will typically remain behind, requiring another drilling step to drill these parts out of the hole so that complete removal of the anchor bolt can be accomplished.

"Expansion" type anchor bolts have been provided in the prior art that are easily removable. Examples are those described in U.S. Pat. Nos. 7,357,363 and 8,353,653. A comparison of these with the anchor bolt 2 shows the "expansion" type to be a species of wedge anchor bolt, but with significant adaptations providing for ease of removability. For example, in the typical expansion type anchor bolt, the cage is formed of one or more spoons suspended by flexible rods or filaments; the wedge is spring-biased to wedge the spoons against the interior surfaces of the hole; a slidable bushing is provided for transmitting a hammering force applied to the bushing to the wedge for knocking the wedge out of its stuck position, placing the bolt in a relaxed configuration in which the bolt becomes loose in the hole; and a means is provided for remotely pulling the wedge relative to the spoons against the spring-bias to allow the bolt to maintain the relaxed configuration as the bolt is pulled out from the hole.

These adaptations have resulted in the cost of expansion type anchor bolts being significantly higher than that of basic, low cost wedge anchor bolts like that shown in FIG. 1, to the extent that, even with the additional drilling step, the low cost wedge type anchor bolt is the least costly alternative.

Accordingly there is a need for a basic wedge anchor bolt, i.e., a wedge anchor bolt that is cost competitive with the bolt 2 shown in FIG. 1, which provides an ease of removability that has heretofore only been available in the relatively expensive "expansion" type anchor bolts.

SUMMARY

Disclosed is an easily removable low cost wedge anchor bolt. The anchor bolt includes a screw member, a wedge member, and a cage member. The screw member has a head defining a proximal end of the screw member, and an elongate shank extending from the head and terminating at a distal end of the screw member. The shank has a threaded end, the head being or having a feature shaped for coupling with a tool so as to render the tool capable of turning the head about an elongate axis of the screw member, thereby either axially advancing or axially withdrawing the threads of the threaded shank. The wedge member is threadably engaged by the threaded portion of the shank. The cage member defines a cavity through which the threaded end of the shank extends and into which at least a portion of the threadably engaged wedge member is allowed to non-forcibly penetrate. The wedge member is shaped in cooperation with the cavity to force the cavity to undergo a radial expansion as a result of being drawn into the cavity by means of advancing the threads of the threaded shank, the wedge member becoming stuck in the cavity as a result.

For ejecting the wedge member from the cavity according to the invention, the screw member includes at least one of (1) one or more depressed portions, and (2) one or more projecting portions, defining a step of abruptly increasing radial dimension of the screw, and the cage member includes one or more corresponding step-engaging portions for making an interference contact with the step when the threads have been withdrawn from the cage and wedge members a sufficient amount, so that further withdrawal of the threads ceases to withdraw the threads relative to the cage member while continuing to withdraw the threads relative to the wedge member, thereby forcing the wedge member distally relative to the cavity.

Preferably, the anchor bolt is limited to screw members having one or more depressed portions for defining the step; more preferably, the one or more depressed portions is a necked-down portion of the screw member; and most preferably, the necked-down portion is substantially cylindrical.

Preferably, in combination with any of the embodiments described above, each of the one or more step engaging portions is or includes a tang depending from the cage member.

Preferably, in combination with any of the embodiments described above, the anchor bolt includes a keeper at the distal-most end of the threaded member, for stopping the wedge member from becoming completely disengaged with the threaded member and thereby preventing the wedge member from being forced away from the threaded member as a result of forcing the wedge member distally relative to the cavity.

Also disclosed is a method for removing an anchor bolt from a hole, where the anchor bolt includes a screw member, a wedge member, and a cage member, the screw member having a threaded end and defining a screw axis, the threaded end of the screw member being threadably engaged into the wedge member, the cage member defining a cavity through which the threaded end of the screw member extends and into which at least a portion of the threadably engaged wedge member is allowed to non-forcibly penetrate. The anchor bolt has been inserted into the hole in a first axial direction parallel to the screw axis, and the wedge member is shaped in cooperation with the cavity to force the cavity to undergo an expansion in one or more directions perpendicular to the screw axis as a result of being drawn into the cavity by means of turning the screw so as to advance the threads of the threaded end, the anchor bolt being thereby wedged in the hole with the wedge member stuck in the cavity.

For ejecting the wedge member from the cavity according to the invention, the method provides a step of turning the screw member in a first radial direction for withdrawing the threads from the wedge member, thereby causing the screw member to translate relative to the cage member in a second axial direction opposite the first axial direction; and a step of stopping the screw member from further axial translation relative to the cage member in the second axial direction while allowing for continued turning of the screw member in the first radial direction, so that further withdrawal of the threads from the wedge member will result in forcing the wedge member in the first axial direction relative to the cavity.

Preferably, during the step of stopping, the method provides a step of continuing to turn the screw in the first radial direction and thereby continuing to withdraw the threads from the wedge member, thereby resulting in forcing the wedge member in the first axial direction relative to the cavity.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION OF PREFERRED EMBODIMENTS

Figure 2:
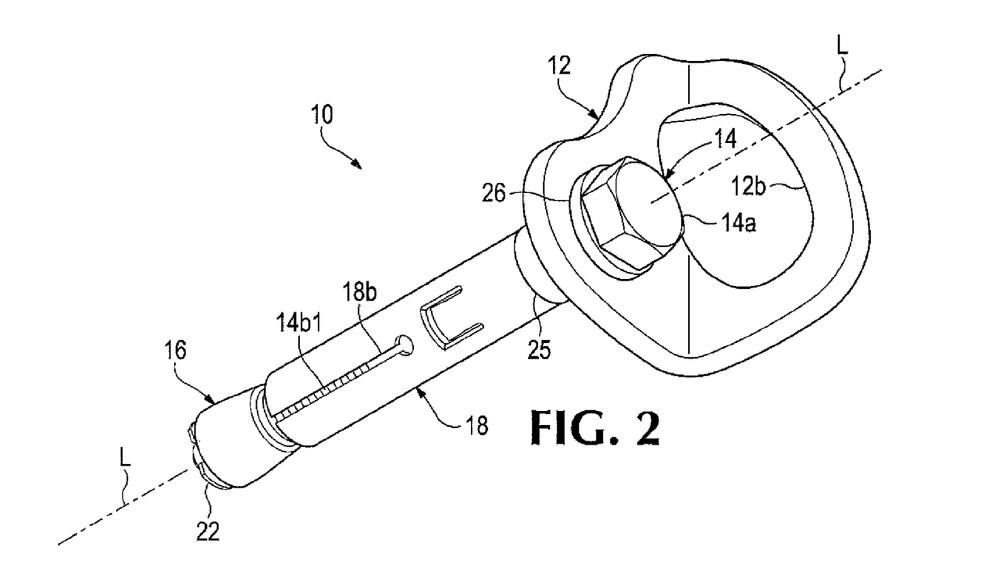
FIG. 2 is an isometric view of an easily removable low cost wedge anchor bolt according to the present invention.
Figure 3:
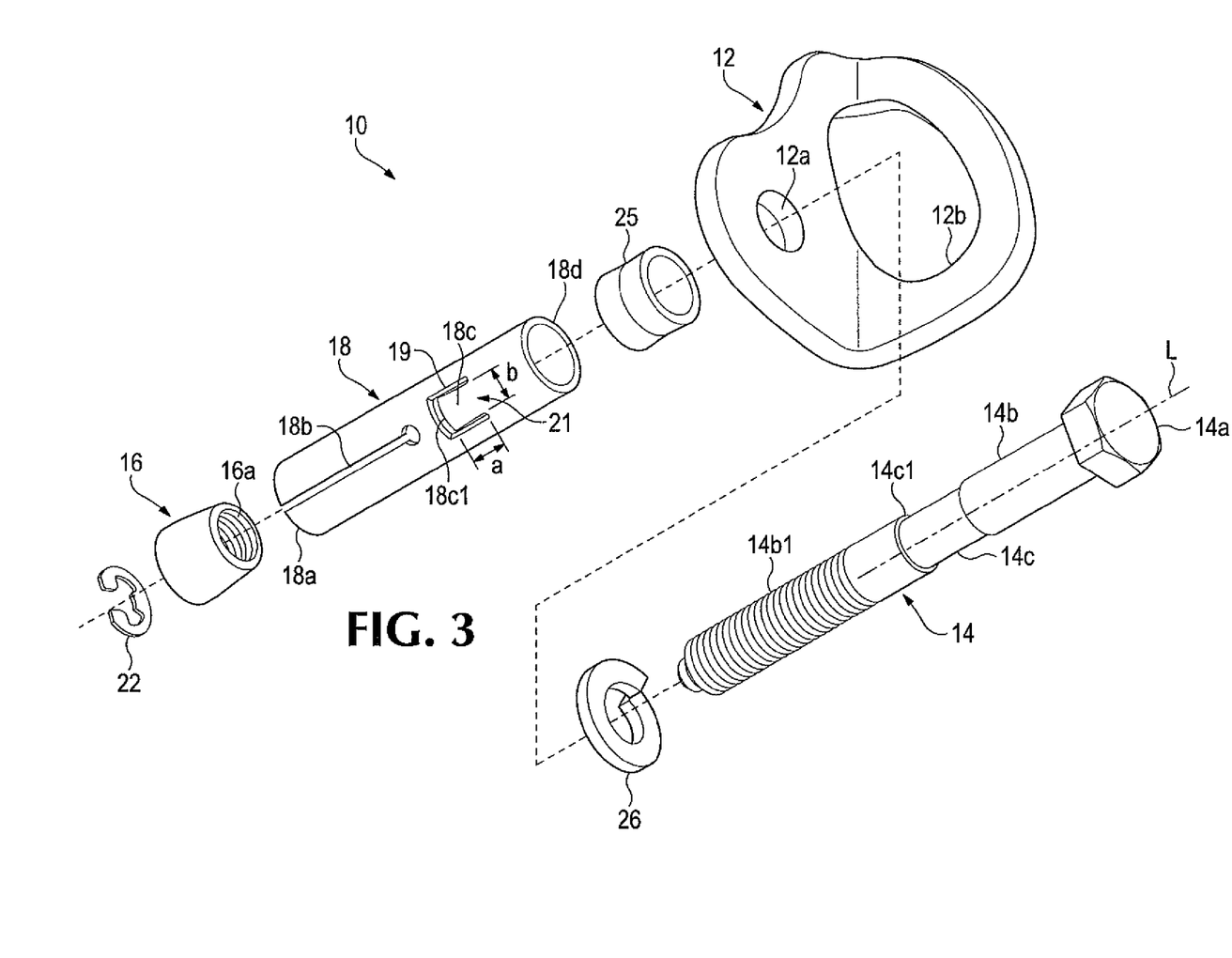
FIG. 3 is an exploded isometric view of the wedge anchor bolt of FIG. 2.

FIGS. 2 and 3 show a preferred removable low cost wedge anchor bolt 10 according to the present invention. It will be understood that the bolt 10 may be used in any application in which standard prior art wedge anchor bolts are used. However, the bolt 10 is particularly advantageous in applications where it is important to be able to easily remove the bolt when its service life is over.

At least two such applications are (1) to provide fall protection for construction workers such as previously described; and (2) to provide temporary anchor points for rock climbers. Like in the construction application, low cost wedge anchor bolts used for rock climbing are installed in holes drilled into the rock. Once in place, the bolts are exposed to the elements making it even more important to remove them after a time, both to ensure climber safety and to return the rock, as much as possible, to its natural condition. This is particularly so if the rock is ferrous and is therefore particularly susceptible to weakening as a result of corrosion of the anchor bolt.

As is standard in the art, the bolt 10 is preferably provided with bolt attachment hardware 12 having two through apertures—a through aperture 12a for receiving the screw 14, and a through aperture 12b for receiving a caribiner as explained previously. The apertures 12a and 12b are both contiguously surrounded by metal, thus preventing any possibility of the screw 14 and the caribiner (assuming no failure of the caribiner itself) escaping from the respective apertures.

Structural support for the bolt 10 is provided by a screw 14 which has a head 14a at its proximal end. The head 14a shown is hexagonally shaped, to allow for turning the screw about its elongate axis "L" by use of a standard hex wrench. The head 14a may have other shapes, or include features such as slots (e.g., for receiving standard bladed or Phillips type screwdrivers) or shaped depressions (e.g., for receiving a standard hexagonally shaped key or Allen wrench) allowing for the same functionality, that is, for turning the screw by use of a standard hand tool.

The screw 14 has an elongate shank 14b which extends from the head 14a and terminates at the distal end of the screw 14. The shank 14b has a threaded end $14b_1$; turning the screw 14 in one radial direction, e.g., clockwise about the axis L, advances these threads in a first axial direction, along the axis L, toward the distal end of the screw, whereas turning the screw in the opposite radial direction withdraws the threads, in a second axial direction opposite the first axial direction, toward the proximal end of the screw.

So far, the screw 14 as described can be any ordinary bolt. To form a low cost wedge anchor bolt, the screw 14 is combined with two more parts, namely a wedge 16 and a cage 18.

The external threads of the threaded end $14b_1$ of the shank 14b of the screw 14 are for engaging complementary internal threads of the wedge 16. The wedge 16 functions in cooperation with a cavity 18a of the cage 18 to force the cavity to undergo a radial expansion, i.e., in directions perpendicular to the axis L, as a result of being drawn into the cavity by means of advancing the threads of the threaded shank. The cavity and, especially, the wedge could have many different shapes to perform this function. Typically, the cavity is (internally) cylindrical and the wedge is (externally) frustoconical, as in the preferred embodiment shown in FIGS. 2 and 3. Thus the description so far describes both the bolt 10 and the prior art bolt 2 shown in FIG. 1. And generally, there is no intention to limit the invention to particular shapes or configurations.

Figure 4:
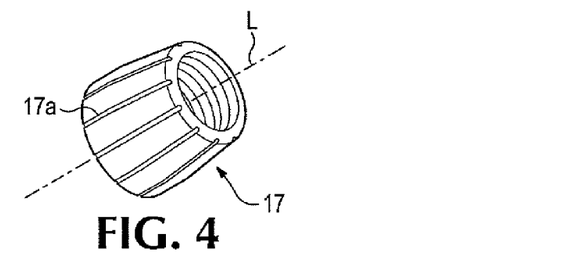
FIG. 4 is an isometric view of an alternative wedge according to the invention.

However, with reference to FIG. 4, an alternative wedge 17 having a series of spaced-apart gripping elements, here axially extending depressions or, in a related alternative (not shown), protusions, provides for an improved grip on the internal surface of the cavity, and thus can be advantageous to reduce the tendency of the wedge to spin inside the cavity as the threads are being advanced. Such gripping elements—depressions or protusions—could be provided in any number of shapes, patterns and configurations, and could be provided on the interior surface of the cavity as well, alone or in combination with gripping elements on the wedge itself.

The cavity is provided at the distal end of the cage 18. It can be adapted for forced radial expansion in any number of ways known in the art. Generally, two or more lines of weakening 18b are provided. The lines of weakening typically run axially, i.e. parallel to the axis L, and are typically apertures that pass through the sides of the cage. However, it is not essential for the lines of weakening to run axially; for example, they could be spirals. It is, however, preferable for lines of weakening to run more axially than radially (perpendicular to the axis L). It is also not essential for a line of weakening to be formed of holes passing through the sides of the cage; for example, it could be a line along which the material of which the cage is formed is thinner, or weaker. Further, it is not essential for a line of weakening to be continuous; for example, it could be a line of perforations. Further still, it is not essential to provide weakening along lines; for example, perforations or apertures could be provided in any desired pattern, so long as sufficient physical integrity of the cavity remains to provide for the anchoring function. Unless otherwise indicated, there is no intention to limit the invention in regards to the configuration of the cavity and wedge combination for achieving the function of forced radial expansion of the cavity by the wedge as a result of drawing the wedge farther into the cavity.

Figure 5:
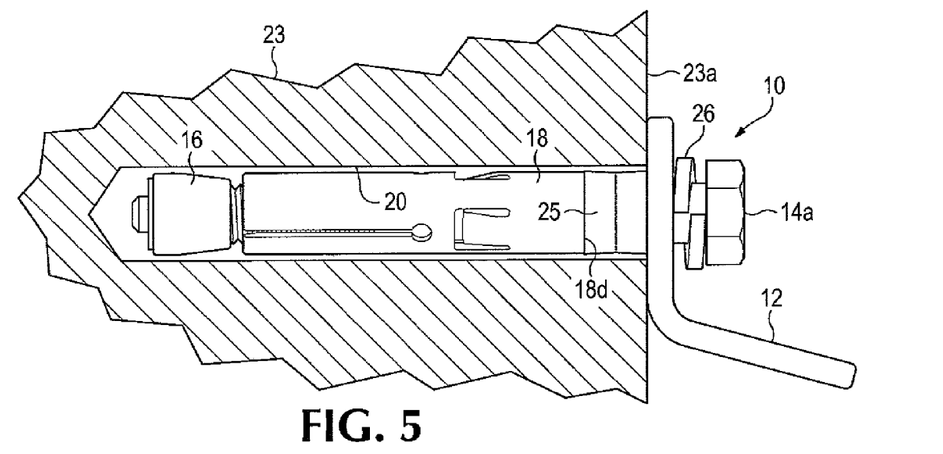
FIG. 5 is a side sectional view showing the anchor bolt of FIG. 2 installed loosely in a drilled hole.
Figure 6:
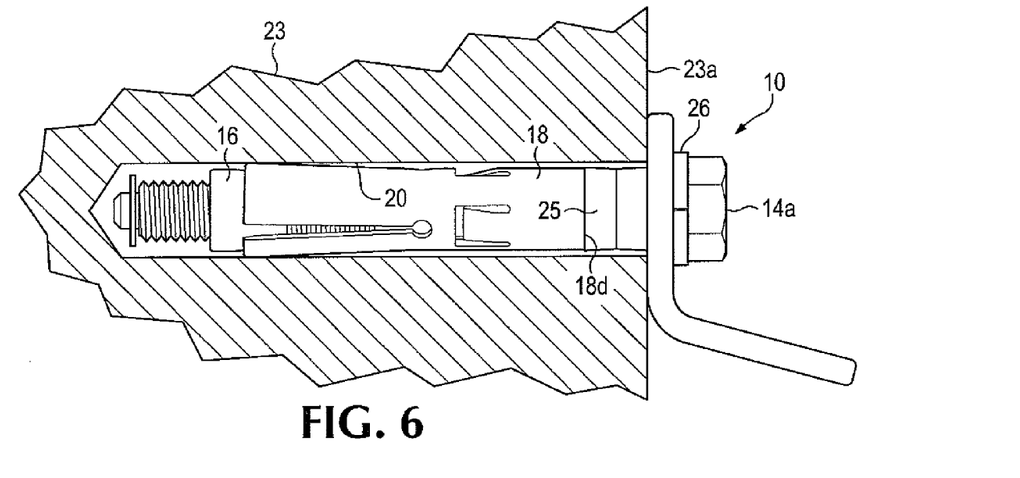
FIG. 6 is a side sectional view of the anchor bolt of FIG. 2 in an anchoring configuration, after having been tightened.

The resulting anchoring is illustrated by FIGS. 5 and 6. FIG. 5 shows the bolt 10 just after insertion into a hole 20 which has been drilled into a concrete or rock wall 23. The bolt is, at this point, loose in the hole.

FIG. 6 shows the same bolt after it has been fully tightened, by turning the head 14a of the screw in the direction required to advance the threads of the threaded end of the screw into the threads of the wedge. When fully tightened, the cavity is forcibly radially expanded, so that outer surface(s) of the cavity is (are) pressed hard against the internal surface(s) of the hole, and the bolt is gripped by the wall 23 as a result of friction between the outer surface of the cage 16 and the inner surface of the hole.

The cavity 18a resists being forcibly expanded due to its own structural integrity, and once it has been expanded sufficiently to seat against the interior surface of the hole, it resists being expanded further by the interior surface of the hole. Thus, tightening the bolt ultimately results in jamming the wedge 16 in the cavity 18a, with the wedge becoming stuck in the cavity.

Loosening the bolt requires turning the head 14a of the screw in the opposite direction that was required for tightening the bolt, thereby withdrawing the threads. Because the wedge is jammed in the cavity, the threads withdraw from the wedge, and the screw 14 starts to back out of the cage 16. If not for the feature described immediately below, the screw would continue to back out of the cage until it becomes fully separated from the bolt, leaving the cage and wedge behind, stuck in the hole as in the prior art.

To solve this problem in accord with the invention, the screw 14 includes a "necked-down" portion 14c, which can be seen in FIG. 3, which results in a step $14c_1$ of abruptly increasing width of the screw; and cooperating with this, the cage 16 includes a corresponding one or more step-engaging portions 18c for interferingly engaging with the step $14c_1$, once the screw 14 has backed out of the cage 16 a sufficient amount for the step to come into interfering contact with a free end $18c_1$ of a step-engaging portion.

Figure 7:
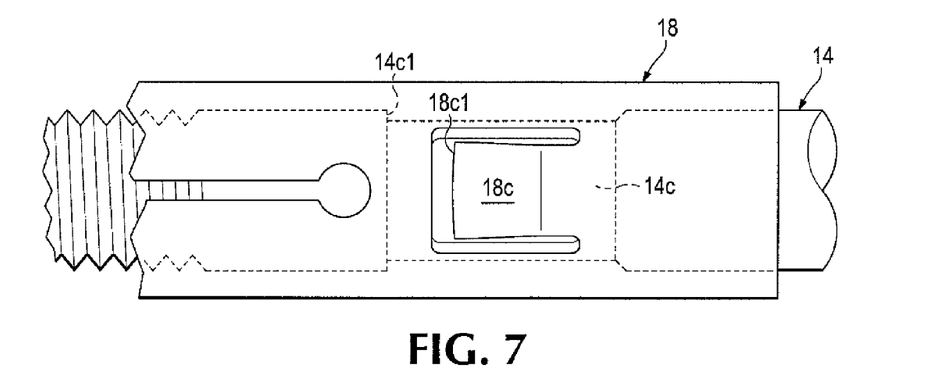
FIG. 7 is a cut-away isometric view of the wedge anchor bolt of FIG. 2, showing a step formed in a screw according to the invention and a corresponding step-engaging portion of a cage according to the invention, the step-engaging portion being shown looking from the top, the step and step-engaging portion being in a first relative position in which the step-engaging portion is spaced apart from the step.
Figure 8:
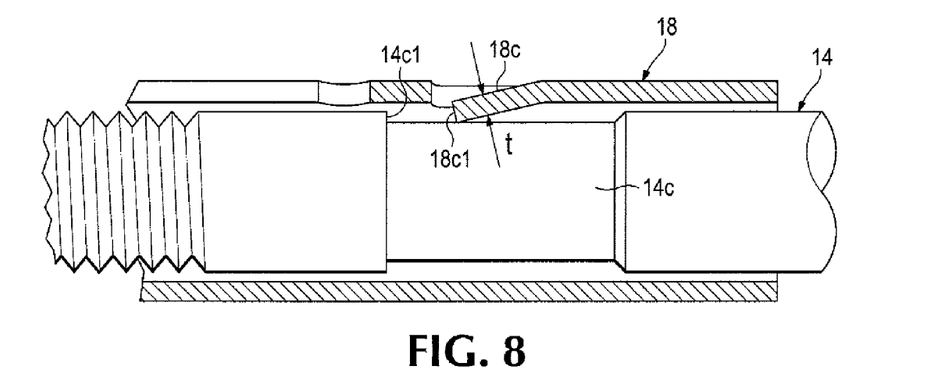
FIG. 8 is a cut-away isometric view of the wedge anchor bolt of FIG. 2, showing the step and step-engaging portion of FIG. 7 with the step-engaging portion being shown looking from the side.
Figure 9:
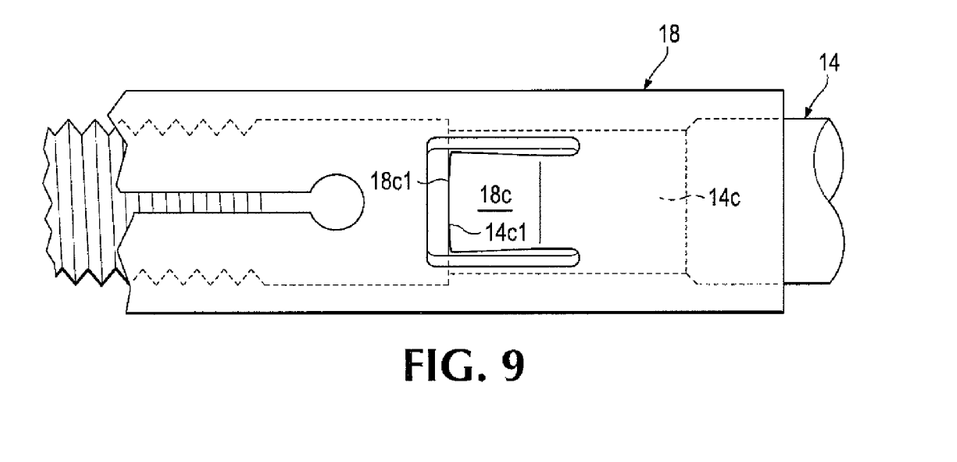
FIG. 9 is a cut-away isometric view of the wedge anchor bolt of FIG. 2, showing the step and step-engaging portion as depicted in FIG. 7 in a second relative position in which the step-engaging portion has made contact with the step, after starting from the first relative position of FIG. 7 and withdrawing the threads of the screw.
Figure 10:
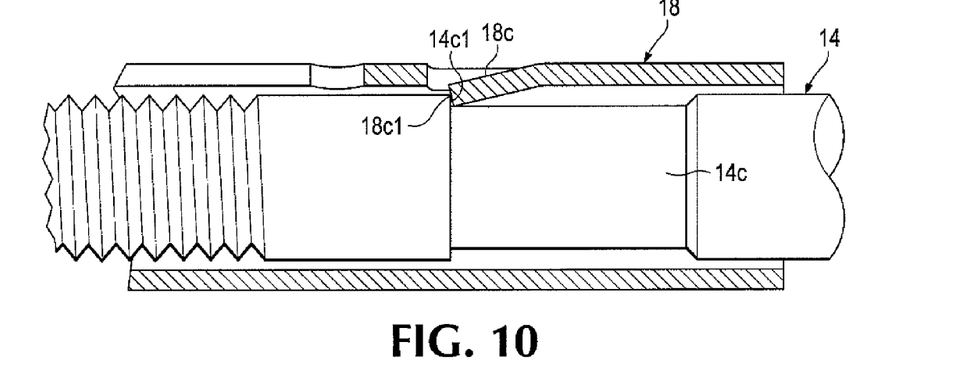
FIG. 10 is a cut-away isometric view of the wedge anchor bolt of FIG. 2, showing the step and step-engaging portion as depicted in FIG. 8 in the second relative position shown in FIG. 9.

FIGS. 7 and 8 show these features prior to the screw 14 being backed out of the cage 16 sufficiently to bring the step into contact with the step-engaging portions of the cage; and corresponding FIGS. 9 and 10 show the same features after such contact has been made, at which point further relative axial movement of the screw relative to the cage is halted. That is, the threads will cease to significantly advance (or withdraw) relative to the cage.

Advantageously, as the threads are still threadably engaged with the wedge 16, continuing to turn the screw 14 so as to continue to withdraw the threads now forces the wedge in the opposite direction, toward the distal end of the screw, thereby forcibly ejecting it from the cavity 18a.

Ejecting the wedge 16 from the cavity results in a relaxation of the grip provided by the cage on the interior surface of the hole, allowing the screw 14 to be pulled from the hole, carrying the cage 18 along with it as a result of the interfering relationship between the step of the screw and the step-engaging portion(s) of the cage.

Figure 11:
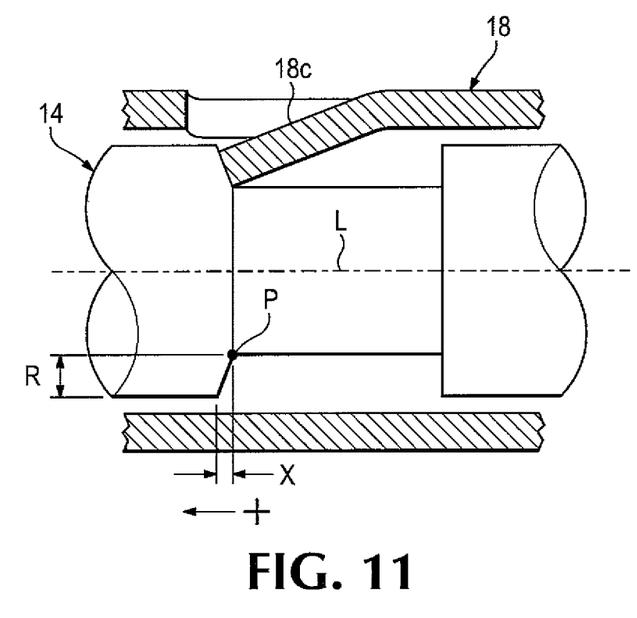
FIG. 11 is a cut-away side elevation of a screw and cage assembly for reference in defining an "abrupt" transition for a step according to the invention.

As the name implies, the step defines a region over which there is a transition, more particularly an increase, in the radial dimension of the screw. With reference to FIG. 11, this transition is preferably "abrupt," meaning that, over a region of "X" units of measure along the axis "L," measured where the screw is adapted to make contact with the step-engaging portion, the radial dimension "R" increases at least 2×, more preferably at least 5×, and most preferably at least 10×. The reason for preferring a more abrupt transition is to confer the greatest mechanical advantage on the step-engaging portion(s). A perfect step is where "X" is zero, and X could also be negative (measured from the point "P" in the direction opposite the "+" direction).

To ensure that the wedge 16 is not ejected so far from the cavity as to become disengaged with the threads of the screw 14, and therefore to reduce the risk that the wedge will be left behind in the hole, a keeper 22, such as a common circlip, is preferably attached to the screw 14 at its distal end in a standard manner. Providing a keeper is preferable but not essential. If the threaded end of the bolt is not too short, the wedge will remain threaded to the screw after it has been ejected from the cavity.

To maintain low cost, the one or more step-engaging features 18c are preferably integrally formed parts of the cage 18. As best seen in FIG. 3, this is by creating, such as by die cutting, one or more elongate apertures 19 through the cage so as to define one or more elongate edges of the feature 18c, which as a result become separated from the remaining portions of the cage 18. The aperture(s) 19 extend only partially around the feature 18e, so that the feature 18c remains connected to the cage 18, such as in the vicinity indicated as 21, as a cantilevered projection. This projection, because it is cantilevered, may be bent, independently of the surrounding material of which the cage is formed, radially inwardly (toward the axis L), allowing the free end of the tang ($18c_1$) to interfere with the step ($14c_1$).

The word "tang" is the closest English word of which Applicant is aware that describes a step-engaging feature like that described immediately above. According to the standard definition, a "tang" is limited to projecting parts that are "slender." With reference to the dimensions "a" and "b" in FIG. 3 for the step-engaging feature 18c, and with reference to the dimension "t" in FIG. 8 of the same feature, there may be an ambiguity as to what is meant by "slender." As shown, dimensions "a" and "b" are roughly equivalent, and it is to be understood that either dimension could be significantly larger than the other. So the feature 18c is "slender" with respect to the dimension "t," being considerably less than either dimensions "a" or "b."

There may also be an ambiguity as to whether a "tang" as ordinarily defined is limited to projections that are monolithic—in the sense of being connected without joints or seams—extensions of the structures from which they depend.

To resolve these ambiguities, as used herein the term "tang" is defined in its ordinary manner, with the proviso that it is connected to the structure from which it projects without joints or seams, implying that it is formed out of the same block of material of which the cage is formed, and it is slender, meaning for purposes herein that, with reference to its width, length, and depth dimensions as measured along three respective mutually orthogonal axes, at least one of these dimensions is significantly smaller than at least one other of these dimensions, where "significantly smaller" means at least 3 times smaller, more preferably at least 5 times smaller, and most preferably at least 10 times smaller.

The reason for preferring a tang that is more slender can be appreciated by recognizing that, since the tang is formed from the same block of material from which the cage is formed, any material devoted to the tang necessarily subtracts from the material that could have been devoted to the cage. Thus the reason to prefer a tang that is more slender is to minimize the amount of material that is not available for strengthening the cage, to use for the step-engaging function, which requires a significant degree of projection (e.g., a significant dimension "b" as shown in FIG. 3, or a significant dimension "l" as shown in FIG. 14) but not much strength.

Figure 12:
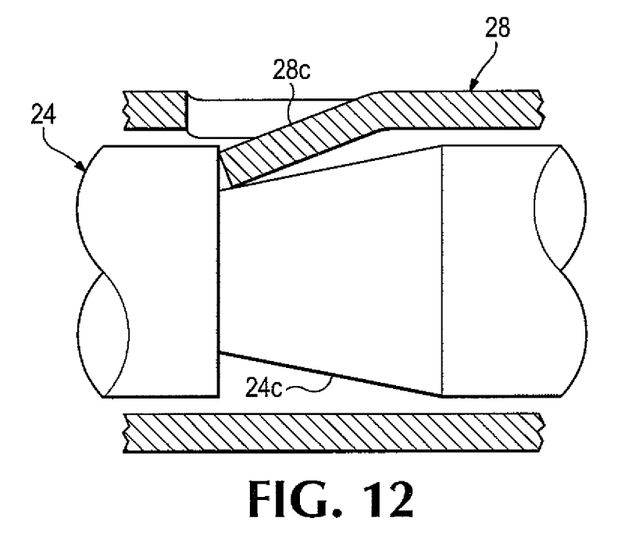
FIG. 12 is a cut-away side elevation of a screw and cage assembly showing an alternative configuration, compared to that shown in FIGS. 3 and 7-10, for a "necked-down" portion of a screw for defining a step according to the invention.

FIG. 12 shows an alternative screw 24 and cage 28, illustrating why it is not important for the necked down portion 24c of the screw to be cylindrical.

Figure 13:
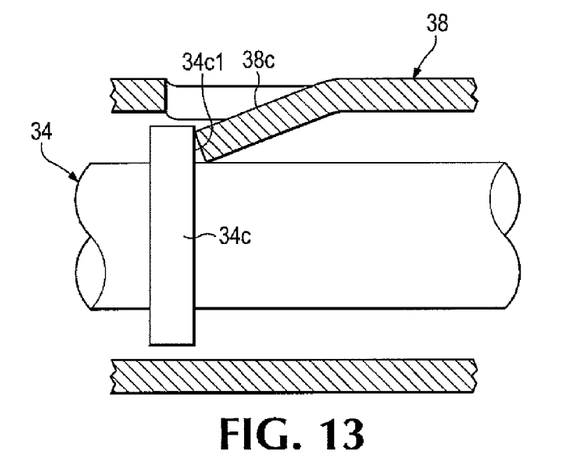
FIG. 13 is a cut-away side elevation of a screw and cage assembly illustrating a "necked-up" portion of a screw for defining a step according to the invention, for comparison with the "necked-down" portions of FIGS. 3, 7-10, and 12.

FIG. 13 shows an alternative screw 34 and cage 38, illustrating an alternative to use of a necked down portion to provide the step. In this case, there is a protruding or "necked up" portion, or projection, 34c of the screw providing a step $34c_1$. The portion 34e could be a removable part, such as a circlip, in which case the screw 34 would have a circumferential groove for receiving the circlip.

Figure 14:
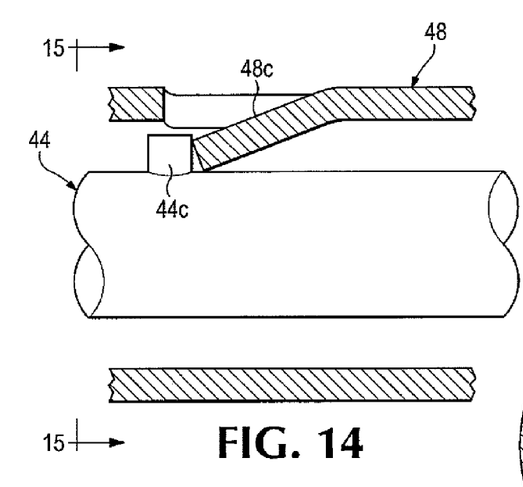
FIG. 14 is a cut-away side elevation of a screw and cage assembly showing an alternative configuration, compared to that shown in FIG. 13, for a "necked-up" portion of a screw for defining a step according to the invention.
Figure 15:
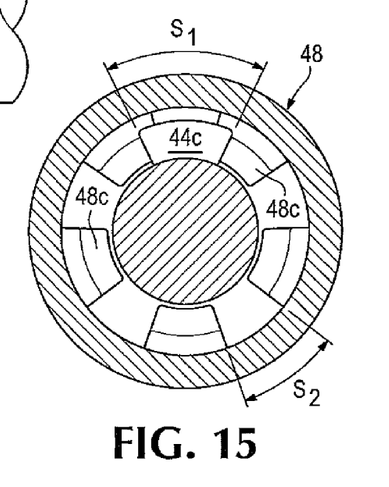
FIG. 15 is a front elevation, taken along the line 15-15, of the screw and cage assembly of FIG. 14.

FIGS. 14 and 15 show another alternative screw 44, illustrating a modification of the screw 34 of FIG. 12. In this embodiment, the screw has a projection 44c that does not encircle the screw as does the projection 34c of the screw 34. Instead, with reference to FIG. 14, the projection 44c extends over an arc length "$S_1$" and step-engaging portions 48e are arranged so that there are no gaps of arc larger than "$S_2$," where $S_2 < S_1$.

The embodiment of FIG. 14 is less preferred than those of FIGS. 12 and 13 because it results in a relative abundance of excess space between the cage and screw, allowing for an excess of undesirable lateral movement of the screw inside the cage.

The embodiment of FIG. 15 is less preferred than that of FIG. 14 because it requires more of the cage to be devoted to the step-engaging function, which tends to weaken the cage if the step-engaging portions are tangs, and which, if the step-engaging portions are attached to the cage with joints or seams, requires more costly manufacturing.

In FIGS. 12-15, the step-engaging portions (28c, 38c, 48c) are tangs.

Figure 16:
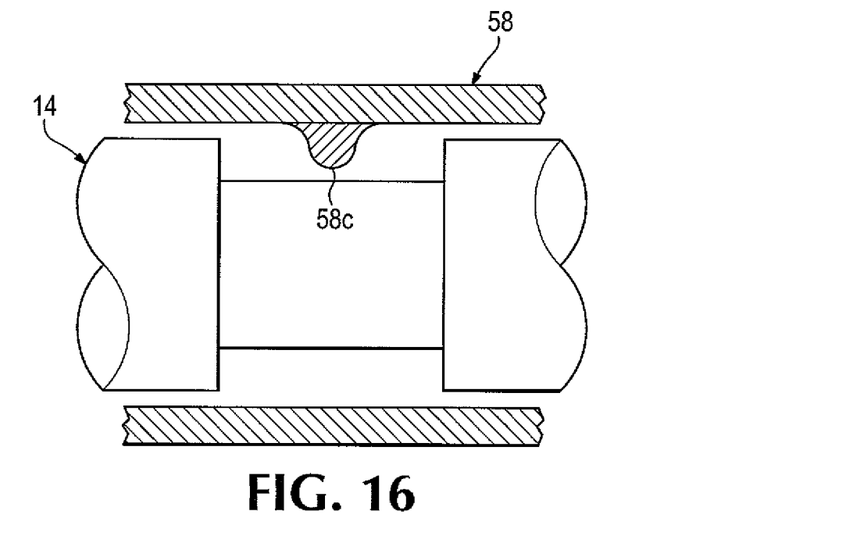
FIG. 16 is a cut-away side elevation of a screw and cage assembly showing a first alternative step-engaging portion to that shown in FIGS. 12-14, according to the invention.

An alternative to the tang is shown in FIG. 16. The screw could be either 14 or 24, or it could have a different configuration from either of these. In this example the step-engaging portion 58c is formed by adding metal to the cage. It is not a tang because it connected to the cage with a joint or seam.

Figure 17:
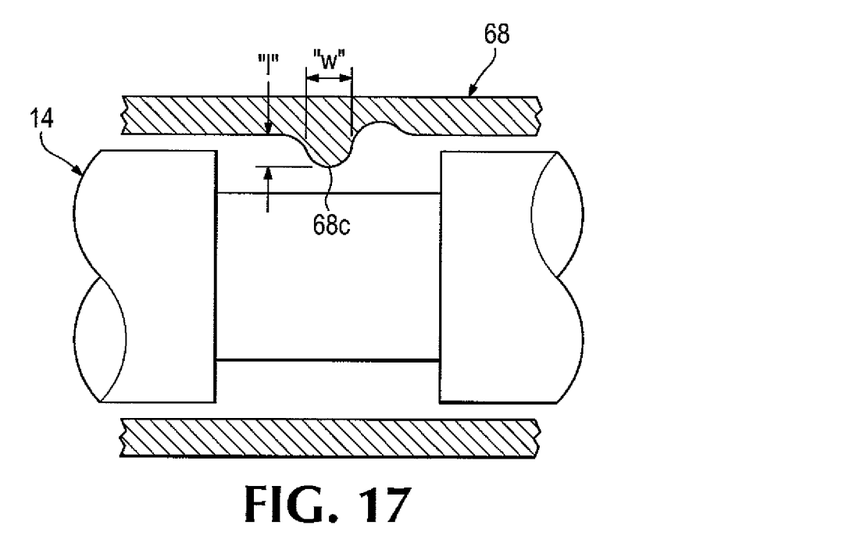
FIG. 17 is a cut-away side elevation of a screw and cage assembly showing a second alternative step-engaging portion, which is an alternative to the step-engaging portion of FIG. 16, according to the invention.

Another possible alternative to the tang is shown in FIG. 17. Again, the screw could be either 14 or 24 or it could have a different configuration from either of these. In this example, the step-engaging portion 68c is formed by displacing metal of the cage 68. It is not a tang if it is not slender, and as drawn, it would not be slender unless its measured dimension perpendicular to the plane of the Figure is significantly less than its dimensions "l" and "w" in the plane of the Figure.

As is standard commercial practice in the art of low cost wedge anchor bolts, the screw, cage, and wedge are all preferably formed of carbon steel. However, other metals—indeed other materials (e.g., fiber reinforced plastics)—could be used without departing from the principles of the invention.

Returning to FIG. 3, preferably the anchor bolt 10 includes a "compression bushing" 25, which is typically formed of a polymer. The compression bushing 25 has a relatively high compliance as compared to the attachment hardware and the cage 18 and has a substantial thickness allowing for a substantial amount of deformation, qualities which allow it to prevent the attachment hardware 12 from making hard contact with the end 18d of the cage 18 before seating against the surface 23a of the structure (see FIG. 6). This function could alternatively be performed by a split-ring washer, or any other structure providing the same or similar qualities.

A split-ring washer 26 may also be provided between the screw-head 14a and the attachment hardware to provide a positive indication to the user of when the anchor bolt 10 is fully tightened.

It is to be understood that, while a specific easily removable low cost wedge anchor bolt has been shown and described as preferred, other configurations could be utilized, in addition to those already mentioned, without departing from the principles of the invention. It should also be understood that, as indicated previously, the concrete anchor point may be used in any application that an anchor point may be used.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. An anchor bolt, comprising:
a screw member having a head defining a proximal end of the screw member, and an elongate shank extending from the head and terminating at a distal end of the screw member, the shank having a threaded end, the head being or having a feature shaped for coupling with a tool so as to render the tool capable of turning the head about an elongate axis of the screw member, thereby either axially advancing or axially withdrawing the threads of the threaded shank;
a wedge member threadably engaged by the threaded portion of the shank; and
a cage member defining a cavity through which the threaded end of the shank extends and into which at least a portion of the threadably engaged wedge member is allowed to penetrate, the wedge member being shaped in cooperation with the cavity to force the cavity to undergo a radial expansion as a result of being drawn into the cavity by means of advancing the threads of the threaded shank, the wedge member becoming stuck in the cavity as a result, wherein, for ejecting the wedge member from the cavity, the screw member includes at least one of (1) one or more depressed portions, and (2) one or more projecting portions, defining a step of abruptly increasing radial dimension of the screw, and wherein the cage member includes one or more corresponding step-engaging portions for making an interference contact with said step when the threads have been withdrawn from the cage and wedge members a sufficient amount, so that further withdrawal of the threads ceases to withdraw the threads relative to the cage member while continuing to withdraw the threads relative to the wedge member, thereby forcing the wedge member distally relative to the cavity.

2. The anchor bolt of claim 1, limited to one or more depressed portions for defining said step.

3. The anchor bolt of claim 2, wherein said one or more depressed portions is a necked-down portion of the screw member.

4. The anchor bolt of claim 3, wherein said necked-down portion is substantially cylindrical.

5. The anchor bolt of claim 4, wherein each of said one or more step engaging portions is or includes a tang depending from the cage member.

6. The anchor bolt of claim 5, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

7. The anchor bolt of claim 4, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

8. The anchor bolt of claim 3, wherein each of said one or more step engaging portions is or includes a tang depending from the cage member.

9. The anchor bolt of claim 8, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

10. The anchor bolt of claim 3, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

11. The anchor bolt of claim 2, wherein each of said one or more step engaging portions is or includes a tang depending from the cage member.

12. The anchor bolt of claim 11, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

13. The anchor bolt of claim 2, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

14. The anchor bolt of claim 1, wherein each of said one or more step engaging portions is or includes a tang depending from the cage member.

15. The anchor bolt of claim 14, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

16. The anchor bolt of claim 1, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

17. The anchor bolt of claim 16, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

18. The anchor bolt of claim 1, further comprising a keeper at the distal-most end of the threaded member, for stopping the wedge member from becoming completely disengaged with the threaded member and thereby preventing the wedge member from being forced away from the threaded member as a result of forcing the wedge member distally relative to the cavity.

19. A method for removing an anchor bolt from a hole, the anchor bolt including a screw member having a threaded end and defining a screw axis, a wedge member into which the threads of the threaded end of the screw member are threadably engaged, and a cage member defining a cavity through which the threaded end of the screw member extends and into which at least a portion of the threadably engaged wedge member is allowed to penetrate, the anchor bolt having been inserted into the hole in a first axial direction parallel to the screw axis, the wedge member being shaped in cooperation with the cavity to force the cavity to undergo an expansion in one or more directions perpendicular to the screw axis as a result of being drawn into the cavity by means of turning the screw so as to advance the threads of the threaded end, the anchor bolt being thereby wedged in the hole with the wedge member stuck in the cavity, wherein, for ejecting the wedge member from the cavity, the method comprises:
- turning the screw member in a first radial direction for withdrawing the threads from the wedge member, thereby causing the screw member to translate relative to the cage member in a second axial direction opposite the first axial direction; and
- stopping the screw member from further axial translation relative to the cage member in the second axial direction while allowing for continued turning of the screw member in the first radial direction, so that further withdrawal of the threads from the wedge member will result in forcing the wedge member in the first axial direction relative to the cavity.

20. The method of claim 19, further comprising, during said step of stopping, continuing to turn the screw in the first radial direction and thereby continuing to withdraw the threads from the wedge member, thereby resulting in forcing the wedge member in the first axial direction relative to the cavity.

\* \* \* \* \*